United States Patent [19]

Bablon et al.

[11] Patent Number: 4,927,543
[45] Date of Patent: May 22, 1990

[54] METHOD AND INSTALLATION FOR TREATING LIQUID BY SEDIMENTATION USING FINE SAND

[75] Inventors: Guy P. Bablon, Felicherolles; Gilbert Desbos, Maisons Laffitte, both of France

[73] Assignee: Omnium de Traitements et de Valorisation (OTV), Cedex, France

[21] Appl. No.: 310,204

[22] Filed: Feb. 14, 1989

[30] Foreign Application Priority Data

Feb. 25, 1988 [FR] France .................... 88 02288

[51] Int. Cl.⁵ ............................................. B01D 21/08
[52] U.S. Cl. ................................... 210/711; 210/738; 210/768; 210/802; 210/208; 210/521; 210/534
[58] Field of Search ............... 210/711, 738, 768, 802, 210/803, 205, 207, 208, 519, 521, 522, 534

[56] References Cited

U.S. PATENT DOCUMENTS

| | | | |
|---|---|---|---|
| 653,010 | 7/1900 | Koyl | 210/205 |
| 2,129,267 | 9/1938 | Fischer | 210/738 |
| 2,268,461 | 12/1941 | Nichols | 210/205 |
| 2,359,748 | 10/1944 | Clemens | 210/711 |
| 3,886,064 | 5/1975 | Kosonen | 210/519 |
| 3,959,133 | 5/1976 | Fulton | 210/711 |
| 4,142,970 | 3/1979 | von Hagel et al. | 210/522 |
| 4,190,539 | 2/1980 | Besik | 210/521 |
| 4,274,968 | 6/1981 | Grutsch et al. | 210/711 |
| 4,290,898 | 9/1981 | von Hagel et al. | 210/522 |
| 4,377,483 | 3/1983 | Yamashita et al. | 210/711 |
| 4,388,195 | 6/1983 | von Hagel et al. | 210/802 |
| 4,579,655 | 4/1986 | Louboutin et al. | 210/208 |
| 4,654,139 | 3/1987 | Baba et al. | 210/205 |

FOREIGN PATENT DOCUMENTS

| | | |
|---|---|---|
| 0087223 | 1/1983 | European Pat. Off. |
| 0139572 | 9/1984 | European Pat. Off. |
| 1411792 | 12/1965 | France |
| 2378550 | 9/1978 | France |

OTHER PUBLICATIONS

Wasserwurtschaft-Wassertechnik, vol. 8, aout 1958, pp. 361–364, Berlin-Est; W. Christ et al, "Uber die Anwendung aktivierter Kieselsaure als Fallhilfsmittel in der Wasserreiningung".

Primary Examiner—W. Gary Jones
Assistant Examiner—Christopher Upton
Attorney, Agent, or Firm—Browdy and Neimark

[57] ABSTRACT

Method of treating liquid by sedimentation in which reagents are injected into a flow of untreated liquid and there is created in the flow a colloid mixing and stabilization area; the flow is passed into an intermediate aggregation area and then into a sedimentation area equipped with separator plates from which clarified liquid is taken; characterized in that insoluble granular material which is more dense than the liquid is injected into the liquid in predetermined proportions in the mixing area where the flow is made turbulent, turbulence is induced in the intermediate aggregation area to maintain the granular material in suspension, virtually all of the granular material is brought into the sedimentation area, the sludge recovered in the sedimentation area is removed, the granular material is removed therefrom (D) and is recycled after cleaning.

20 Claims, 4 Drawing Sheets

METHOD AND INSTALLATION FOR TREATING LIQUID BY SEDIMENTATION USING FINE SAND

The invention concerns a method and an installation for treating liquid by thickening and sedimentation (especially clarification and purification treatment).

The principal aim of this treatment is to eliminate materials in suspension from the untreated liquid. The liquid clarified in this way then undergoes subsequent treatment operations to render it acceptable for domestic consumption, usable for industrial or agricultural requirements or suitable for return to the natural environment, as required.

The particles in suspension to be eliminated can be of very different kinds, of very small size (in the order of 1 micron) and in proportions that can be anywhere from very low to very high: they cannot be separated out directly by natural sedimentation at a high rate and it is therefore known to add beforehand to the untreated liquid auxiliary treatment agents which by chemical or physical action favour the formation and growth of particles (usually called flocks) that are relatively easy to separate by sedimentation in a later phase. Generally speaking these auxiliary agents include coagulating agents such as mineral salts (iron or alumina sulphate, ferric chloric, etc.) which cause hydrolysis of the materials in suspension and flocculating agents ("polyelectrolyte" type polymers, etc.) which favour the agglomeration and growth of seed particles formed in this way.

The aggregates of flocks formed in this way are then passed through one or more sedimentation areas in which clarified liquid is recovered from the upper part and sludge is recovered from the base, possibly for commercial exploitation following appropriate treatment.

This method has been improved in numerous ways to increase the rate of output of clarified liquid and the capacity for extraction of materials in suspension (reduced solid particle content and turbidity). Reference may usefully be had to a contribution by DAUTHUILLE to the Nice Congress of June 15-18, 1987 published by the A.G.T.H.M. in the Congress Proceedings.

For example, attempts have been made to accelerate the formation of flocks in the thickening and flocculation phase by introducing seed particles.

The patent FR-No. 1,41,792 filed Aug. 4, 1964 proposes to inject into the liquid containing reagents an auxiliary clarification substance, in particular fine grains of sand (20 to 200 $\mu$m). After dispersion of the fine sand the untreated liquid is caused to circulate at a rate which continuously decreases: downwards to enable growth of flocks formed on the grains of sand up to a size in the order of 1 to 4 mm as gravity favours stabilization of the dispersion of sand in the liquid, then upwards as gravity tends to cause flocks ballasted by the sand to fall back towards the bottom. The sandy sludge formed in this way is recovered and the sand particles separated out. In sedimentation units operating according to this principle, known as "CYCLOFLOC" units, sedimentation rates of 6 to 8 m/h are routinely obtained.

The reader is reminded that the sedimentation rate is the quotient of the flowrate (in m$^3$/h) divided by the free surface area (in m$^2$) of the sedimentation area.

There has also been proposed, notably in the patents FR-No. 1,501,912 (filed Sept. 28, 1966) and FR-No. 2,071,027 (filed Dec. 16, 1969), a method whereby the untreated liquid is caused to pass upwards through a fluidised bed of granular material (in practice sand) with a continuously decreasing upward speed. Sand laden with sludge is taken from the fluidised bed and recycled after separating out the sludge. Separator plates are provided above the fluidised bed for improved sedimentation. Sedimentation or clarification units operating according to this principle, usually called "FLUORAPID" units, have yielded output (overflow or sedimentation) rates of 8 to 15 m/h.

More recently there has been developed a sedimentation process that does not use sand and which in a version disclosed in patent FR-No. 2,553,082 filed Oct. 7, 1983 teaches the provision of an intermediate thickening and sedimentation chamber between a reaction (flocculation and/or precipitation) chamber and a sedimentation chamber equipped with separator plates. The reaction chamber comprises two chambers communicating at their upper and lower ends; an axial flow screw induces in the central chamber a flowrate that is very much higher than the flowrate of the incoming untreated liquid which causes recycling from the lateral chamber to the base of the central chamber. Some of the sludge recovered from the bottom of the intermediate chamber is also returned to this point. The liquid laden with flocks overflows into the upper part of the intermediate chamber: the flocks thicken here and 85 to 95% of them are deposited on the bottom. The partially clarified liquid then enters the sedimentation chamber for sedimentation to be completed; the low residual density of the flocks avoids the accumulation of sludge under the sedimentation plates which could slow down the overall sedimentation process. It would seem that in this way it is possible to obtain sedimentation rates as high as 35 m/h if the contraints in respect of the quality of the treated liquid are moderate, as is the case with urban waste water.

It will be understood that in known solutions the thickening of the flocks takes place in an area where there is no agitation or turbulence likely to disrupt the growth of the flocks.

The present invention is directed to further increasing the sedimentation output rate without compromising the quality of the liquid treated in this way.

It proposes a method of treating liquid by sedimentation in which reagents are injected into a flow of untreated liquid in which a colloid mixing and destabilisation area is created, said flow is caused to circulate in an intermediate colloid aggregation area and then into a sedimentation area equipped with separator plates from which clarified liquid is moved, characterized in that insoluble granular material denser than the liquid is injected into the liquid in predetermined proportions in the mixing area where the flow is made turbulent, turbulence is induced in the intermediate aggregation area to maintain the granular material in suspension, substantially all of the granular material is brought into the sedimentation area, the sludge recovered in the sedimentation area is removed and the granular material is removed therefrom and recycled after cleaning.

It also proposes an installation for treating liquid by sedimentation comprising, in series, a colloid mixing and destabilisation chamber provided with untreated liquid and reagent inlets and an agitator device, an intermediate aggregation chamber and a sedimentation chamber equipped with separator plates provided in its upper part with a clarified liquid outlet and in its lower part with a sludge recovery area, characterized in that it comprises an inlet for granular material insoluble in the liquid and more dense than the liquid in the mixing chamber, an agitation device in the aggregation chamber and an outlet for sludge recovered in the sedimentation chamber to a sludge/granular material separator station to an outlet from which the granular material inlet is connected.

It will be realized that the invention is characterized in relation to known solutions by the use of granular material in combination with significant turbulence in the aggregation area. Most of the sedimentation occurs in the sedimentation area containing the separator plates, which is just what the more recent solutions attempt to avoid.

There was previously no reason to suppose that injecting granular material could improve the rate of sedimentation relative to any of the known solutions, all the more so in that turbulence seemed to have disadvantages: it requires the addition of an external regeneration circuit for separating the sludge formed from it prior to recycling; also, in the specific case of sand its undesirable abrasive properties could discourage those skilled in the art from using it.

What is more, it was not evident that there was any benefit in providing between the reaction chamber and the sedimentation chamber an aggregation chamber without sedimentation occuring in the latter. The more recent solutions nevertheless provide an intermediate chamber of this kind with the express purpose of having no sedimentation occur in it.

Finally, and most importantly, it was not evident that it was possible to achieve without sedimentation any growth of the aggregates formed by aggregation of colloids around particles of granular material in the intermediate chamber: maintaining these aggregates in suspension without sedimentation requires stirring which would at first sight seem incompatible with retention of the material on the grains of sand and consequently to exclude any phenomena of growth: the use of granular material therefore seemed at first sight to rule out the concept of a thickening chamber with no sedimentation.

However, trials have shown that the invention makes it possible to achieve sedimentation rates greater than the known rates (30 to 60 or even 90 m/h) without compromising the clarification of the liquid obtained.

In a complementary way the invention teaches that the granular material be mixed with the untreated liquid containing its reagents in an agitated, highly turbulent area, which differs significantly from the prior art which at most provided for low turbulence recycling between two areas separated by a partition in which the liquid circulates in opposite directions.

The granular material may be sand. More generally, it may be selected from either of two major categories of natural or man-made materials. Thus it may be a chemically inert material which does not contribute to the treatment of the liquid under the required conditions: in this category mention may be made in particular, in addition to sand and microsand, of garnet, basalt, metal oxides, especially iron oxides, pumice, etc. In addition to its physical properties the material may also be chemically and/or biologically active so that it can contribute to the treatment of the liquid; in this category mention may be made in particular of activated charcoal, ion exchanger resins, calcium carbonate, zeoliths, etc. On the basis of other criteria a granular material will advantageously be selected having as low as possible a negative surface potential or even a positive surface potential.

In preferred embodiments of the method in accordance with the invention, some of which may be combined with each other:

there is maintained in the mixing area a speed gradient significantly greater than that maintained in the intermediate aggregation area;

in the case of fine sand there is established in the intermediate aggregation area a speed gradient between 400 and 1,500 $s^{-1}$;

in the case of fine sand there is established in the mixing area a speed gradient between 1,500 and 4,000 $s^{-1}$;

in the case of fine sand the speed gradient in the mixing area is preferably between 3,000 and 3,500 $s^{-1}$ and the speed gradient in the aggregation area is preferably between 700 and 900 $s^{-1}$.

In preferred embodiments of the installation in accordance with the invention, some of which may be combined with each other:

the mixing chamber and the intermediate aggregation chamber are approximately square in cross-section and the ratio between the dimension of each chamber and the diameter of the corresponding agitator device is between approximately 0.5 and 0.8;

the agitator device of the mixing chamber is a paddlewheel rotated about a vertical axis by a motor adapted to impart to the paddle blades peripheral speeds between 1 and 2 m/s and the agitator device of the intermediate aggregation chamber is a paddlewheel rotated about a vertical axis by a motor adapted to impart to the paddle blades peripheral speeds between 0.2 and 2.5 m/s;

the circulation of the liquid from the mixing chamber is achieved by overflow over a horizontal upper edge of a first separator wall between the mixing chamber and the intermediate aggregation chamber, by underflow beneath a horizontal edge of a second separator wall between the intermediate aggregation chamber and a lateral chamber, by overflow over an upper edge of a separator partition between the lateral chamber and a lateral distribution passage running along the length of the sedimentation chamber, and then by underflow under a lower edge of a separator wall between the lateral distribution passage and the sedimentation chamber, this lower edge being inclined upwardly in the direction away from the lateral chamber; these flow directions may also be reversed provided that an appropriate number of separator walls or partition are provided for the flow of liquid to enter the sedimentation chamber from the bottom;

the intermediate aggregation chamber is approximately square in cross-section and the vertical distance between the upper edge of the first wall and the lower edge of the second wall is between 1 and 3 and preferably between 1 and 1.5 times the dimension of the intermediate aggregation chamber and the agitator device is situated relative to the upper edge of the wall at a depth between 0.5 and 0.9 times (preferably between 0.6 and 0.7 times) this height; the agitator device of the intermediate aggregation chamber is an axial flow screw preferably driven in the direction tending to oppose the flow of the liquid.

Objects, characteristics and advantages of the invention will emerge from the following description given by way of non-limiting example only with reference to the appended drawings in which.

Figure 1:
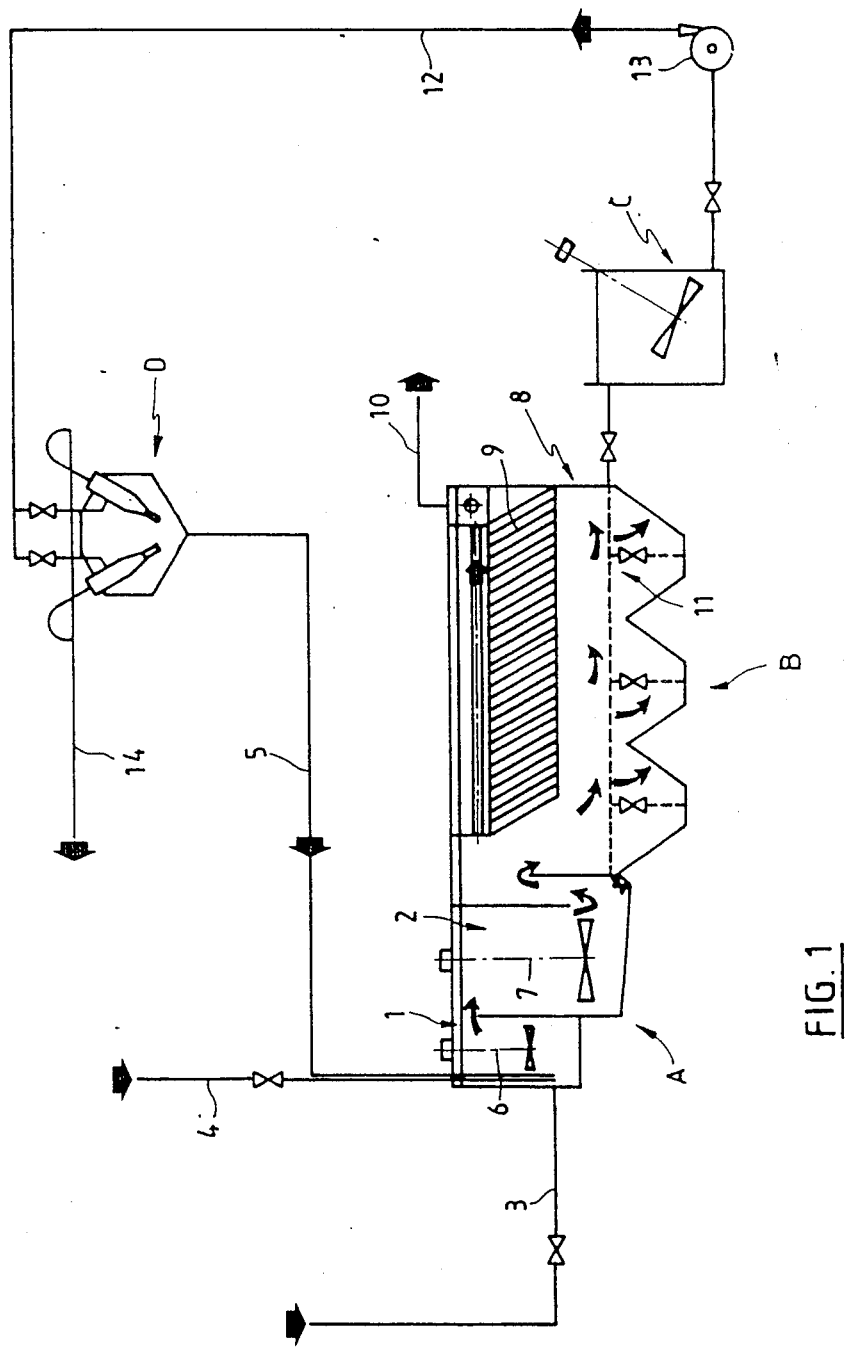
FIG. 1 is a schematic view in longitudinal cross-section of a sedimentation installation in accordance with the invention using fine sand as the granular material.
Figure 2:
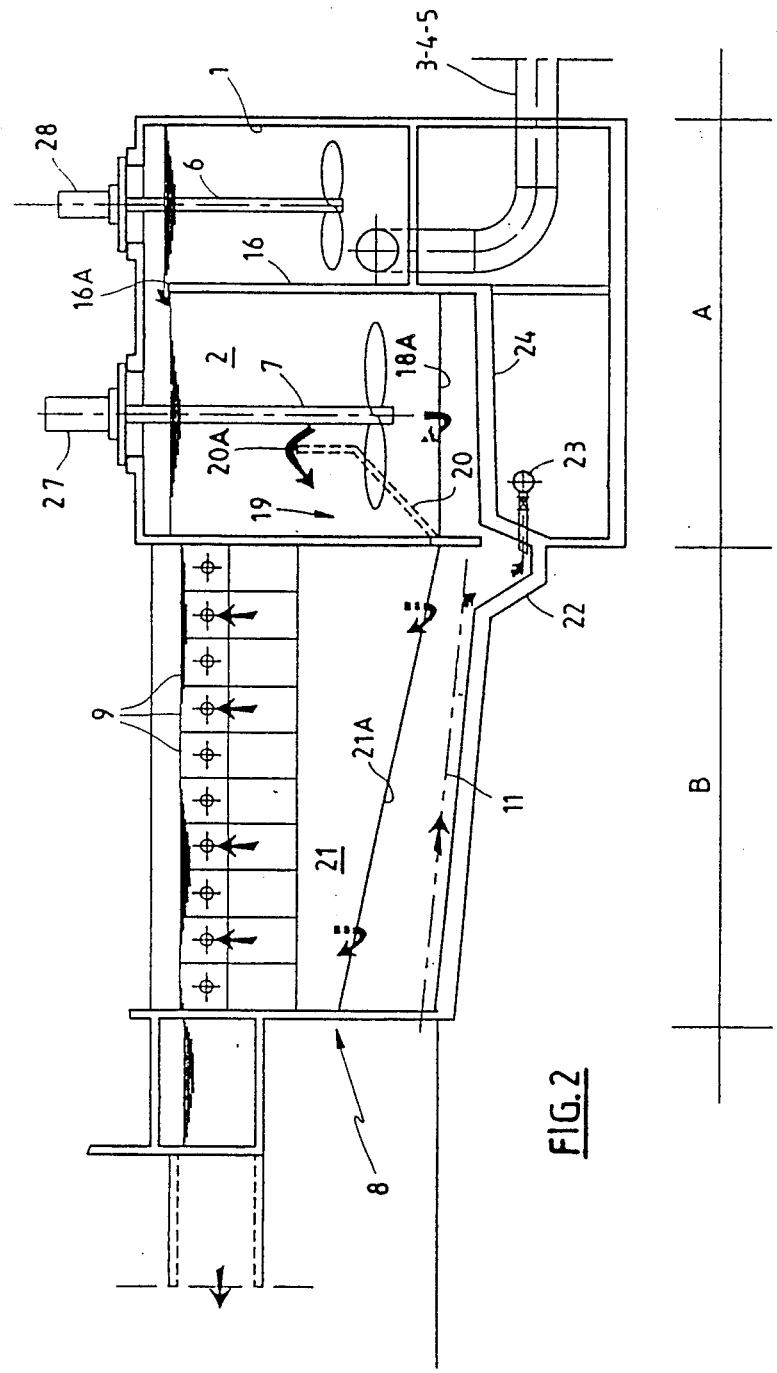
FIG. 2 is a schematic view in longitudinal cross-section on the line II—II in FIG. 3 of another embodiment without the circuit for recycling the fine sand.
Figure 3:
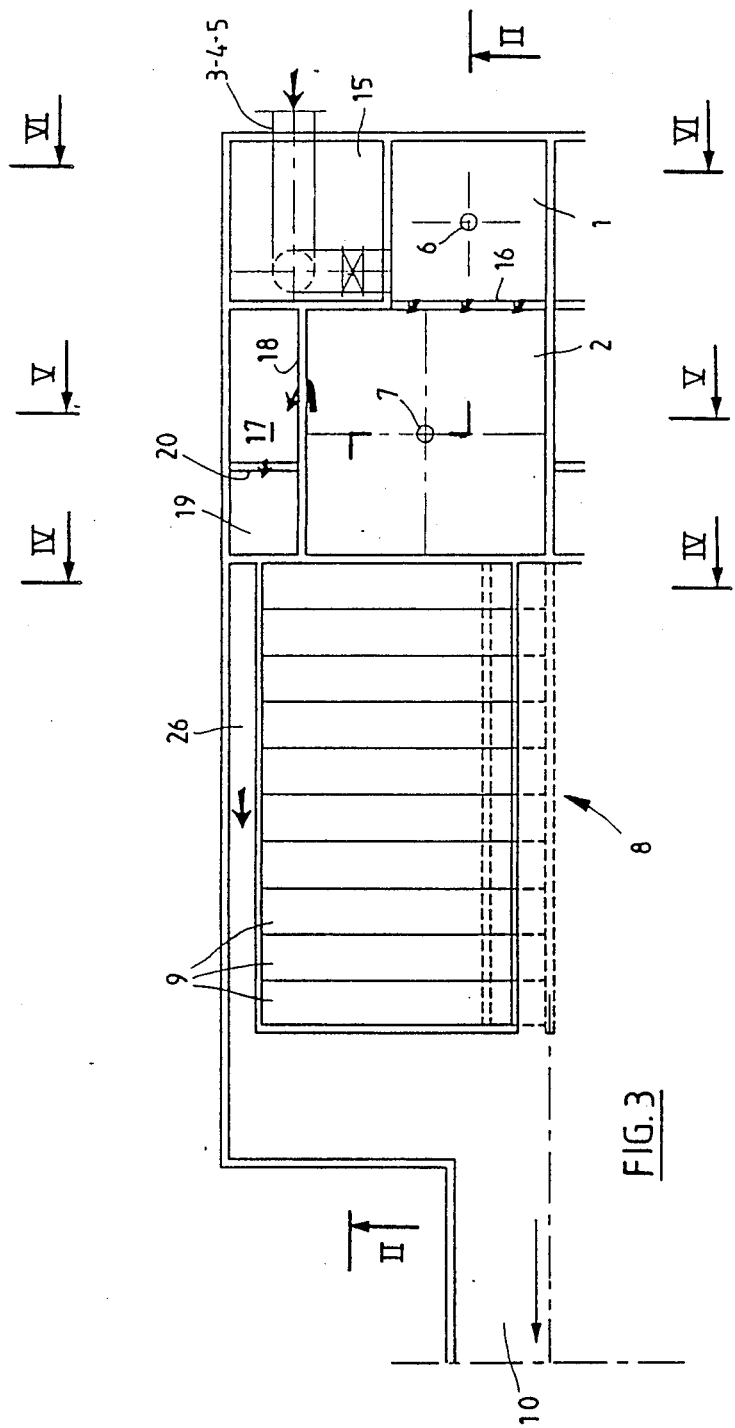
FIG. 3 is a plan view of it.
Figure 6:
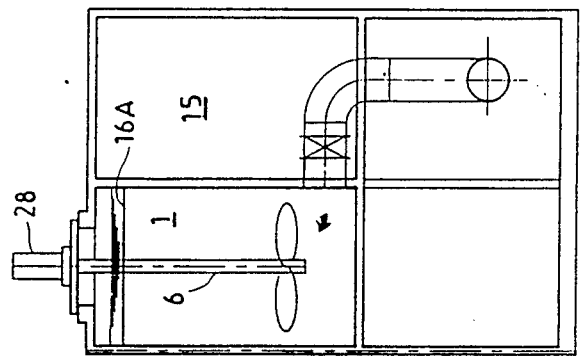
FIG. 6 is a view of it in transverse cross-section on the line VI—VI in FIG. 3.
Figure 5:
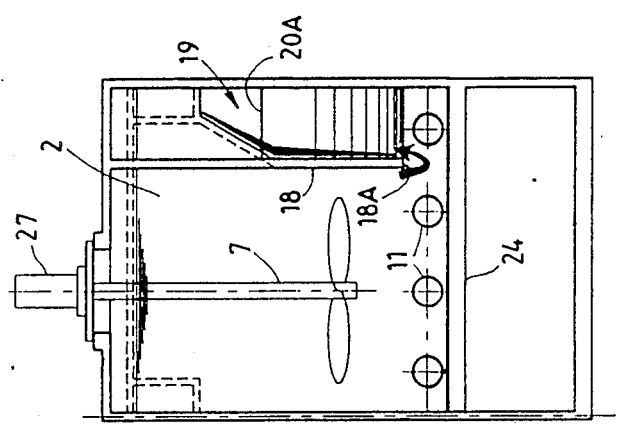
FIG. 5 is a view of it in transverse cross-section on the line V—V in FIG. 3.

The FIG. 1 installation includes a series of intercommunicating chambers defining an aggregation area A, a sedimentation area B, a sludge recovery tank C and a sludge/sand separator D.

The reaction-aggregation area A includes a mixing chamber 1 in which colloids contained in the untreated liquid are destabilised and an intermediate aggregation chamber 2 in which the destabilised colloids aggregate around grains of fine sand. Into the mixing chamber 1 discharges a pipe 3 supplying untreated liquid, advantageously already thickened, a pipe 4 supplying a flocculation additive and a pipe 5 supplying fine sand from the separator D.

The chambers 1 and 2 include respective agitator devices 6 and 7.

The sedimentation area B includes a chamber A provided with separator plate assemblies 9; in the upper part of the chamber 8 there are provided liquid offtake means leading to a pipe 10 for removal of clarified liquid and means 11 for removal of sludge collected under the separator plate assemblies are also provided for taking the sludge to the tank C. A pipe 12 provided with pumping means 13 sludge loaded with fine sand from the sedimentation chamber to the separator D; the latter in practice comprises hydrocyclones from the outlet of which sludge without sand is taken off by a pipe 14 and from which the regenerated fine sand is taken off by the pipe 5.

In the embodiment shown in more detail in FIGS. 2 through 6 in which the same reference numbers are used for the same parts as in FIG. 1 the chambers 1 and 2 are square in cross-section with a depth (see below) equal to or slightly greater than the dimension of their sides. They may be concrete or steel tanks.

Besides the mixing chamber 1 is a feed chamber 15 at which the various feed pipes terminate. The mixing chamber 1 is separated from the aggregation chamber 2 by a partition 16 which has a horizontal upper edge 16A forming an overflow.

Beside the intermediate aggregation chamber 2 is a lateral chamber 17 separated by a wall 18 ending at a lower edge 18A.

The lateral chamber 17 communicates with a distribution passage 19 from which it is separated by a wall 20 having an upper edge 20A.

The lateral distribution passage 19 flanks the sedimentation chamber 8 longitudinally, being separated from it by a wall 21 the lower edge 21A of which is inclined starting from the chamber 3, in this instance approximately from the level of the edge 18A.

Figure 4:
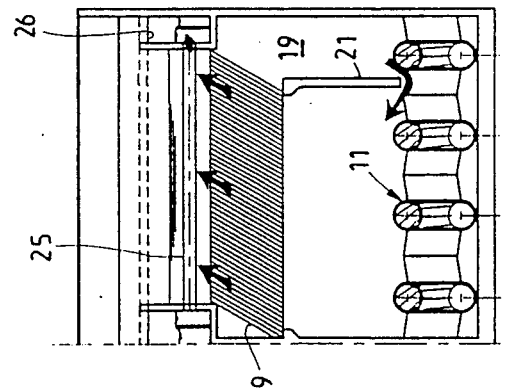
FIG. 4 is a view of it in transverse cross-section on the line IV—IV in FIG. 3; p

In the upper part of the chamber 3 there are provided various separator plate modules 9 with plates inclined transversely upwardly to the right in FIG. 4 and therefore in a direction which tends to direct the flow towards the passage.

Underneath the separator plate modules 9 are means 11 for collecting sludge into a trench 22 communicating with a sludge collector 23 situated in an area beneath the intermediate aggregation chamber 3 from which it is separated by a wall 24.

The trench communicates with the bottom of the chamber 3 to provide for recovering residues that have fallen under their own weight. In an alternative arrangement which is not shown the trench is directly under the chamber 3 with no wall 24.

The bottom of the sedimentation chamber 8 is inclined towards the trench 22 and the collection means 11 comprise endless screws, for example.

Above the separator plate modules are offtake tubes 25 leading to lateral through 26 communicating with the water offtake pipe 10.

The height between the edges 16A and 18A (see FIG. 2) is advantageously between 1 and 1.2 (in this instance 1.2) times the side length of the square chamber 3 and the agitator device 7 is situated relative to the edge 16A at a depth between approximately 0.75 and 0.90 times (in this instance 0.8 times) this height.

The agitator device 7 is of the paddlewheel type and has a diameter between approximately 0.65 and 0.75 times the side length of the chamber 3, in this instance 0.7 times this side length.

The agitator device 7 is driven by a motor 27 adapted to rotate it at a speed such that the peripheral speed of the ends of the paddles is between approximately 1 and 2 m/s. The agitator device 6 in the mixing chamber 1 is driven by a motor 28 adapted to rotate it at a speed such that the ends of the paddles (which also have a diameter of approximately 0.7 times the side length of the chamber 1) move at a speed in the order of 0.7 to 1.5 m/s.

These agitator devices have thin paddles.

The agitator devices 7 is of the axial flow helical type, for example, and is driven in such a way as to oppose the direction of flow and so generate strong turbulence sufficient to maintain the fine sand in suspension in the liquid flowing towards the lateral chamber under the separator plate modules 9.

In operation the agitator device 6 is driven at a greater peripheral speed than the agitator device 7 so that the contents of each chamber 1 and 2 are energetically agitated, creating in them turbulence that is more intense in the chamber 1 than in the chamber 2.

Reasoning in terms of the speed gradient G to quantify the deformations induced in the liquid, it can be said that the speed gradient applied in the chamber 1 is greater than that applied in the chamber 2.

The reader is reminded that this parameter is defined by the equation:

$$G = (P/\mu \cdot V)^{\frac{1}{2}}$$

where $P = Np \cdot \rho \cdot N^3 D^5$ in the case of a mechanical agitator where:

G is the speed gradients (in $s^{-1}$),
P is the power dissipated in the fluid (in W),
$\mu$ is the viscosity of the fluid (in kg/m.s),
V is the volume of the fluid (in $m^3$),
Np is the power number of the agitator (the non-dimensional coefficient of drag of the agitator blade in the fluid),
$\rho$ is the mass per unit volume (in kg/$m^3$),
N is the rotation speed of the agitator blade (rps),
D is the diameter of the agitator paddle (in m).

The relevance of this parameter is discussed in an article by CORNET entitled "Determination des gradients hydrauliques dans les differentes phases du traitement des eaux" ("Determination of hydraulic gradients in various liquid treatment phases") in the review "La Technique de l'Eau et de l'Assainissement", No. 418 - October 1981 - pp. 21-32, and in an article by POLASEK entitled "The significance of the root mean square velocity gradient and its calculation in devices for water treatment" in Water SA-Vol.5 No. 4, October 1979, p. 196–207.

There is preferably induced in the mixing chamber 1 a speed gradient between approximately 1,000 to 1,500 and 4,000 s$^{-1}$ (or more), for example in the order of 3,000 to 3,500 s$^{-1}$. There is preferably induced in the aggregation chamber a speed gradient between approximately 300 to 400 and 1,500 s$^{-1}$ (or more), for example in the order of 700 to 900 s$^{-1}$.

This corresponds to a processing time in the chamber 2 equal to approximately 2.5 to 3.5 times the treatment time in the mixing chamber 1.

It will be realized that the speed gradients taught by the invention are very much higher than those currently practiced in flocculation (below 30 s$^{-1}$). It is therefore possible to state that the aggregation/aggregation phenomena proposed by the invention are of a different nature from known flocculation phenomena in a way that will be found surprising by those skilled in the art.

In operation the untreated liquid fed into the first rapid agitation chamber or tank 1 at its base receives immediately it enters the chamber or tank the reagents, thickening agent, flocculating agent and fine sand; from the primary turbulence related to the circulation of the conditioned untreated liquid which produced the strong agitation in the tank secondary turbulence with very high shear coefficient is generated by the fine sand conveyed in the liquid; this increases the number of effective contacts (impacts) between colloidal particles to be coagulated (discharged) and hydroxides by direct contact and most importantly through the intermediary of the find sand which therefore has also a supporting role. The subsequent passage of the liquid being treated into the second tank or chamber 2 with agitation maintained for about six minutes procures complete conditioning of the liquid to be treated by virtue of the effectiveness of the fine sand held in suspension which cannot settle out inadvertently: this liquid will have to pass several times (N times where N is the ratio between the circulation flowrate generated by the agitation and the flowrate of the liquid to be treated in transit in the capacity) an area of strong turbulence which is isotropic and constitutes a barrier to very short "turbulence lengths" similar in scale to the colloidal impurities to be discharged, and then to be brought together by absorption and bridging on the grains of fine sand.

The speeds of the liquid and of the fine sand in suspension like the profile of the path in the lateral channels between the mechanical agitation and sedimentation chambers are designed to prevent fine sand settling out until its action has been completed, that is to say until it has reached the area under the plates 9. In this area the impurity particles thickened into granular aggregates that are very heavy as they are laden with the grains of fine sand are slow relative to the liquid conveying them and then settle out onto the plates 9 which are inclined at 60° and from which they slide into the sludge trench 22. The treated liquid taken up from above the plates is generally taken off to further downstream processing and the sludge deposited in the trench is extracted sequentially in the example in question here (in other cases the sludge is deposited on a bed and continuously scraped off, pushed into a single hopper and then removed).

The sludge is then conveyed to the sludge/fine sand separation system which generally comprises batteries of cyclones. The regenerated fine sand recovered is returned to the start of the process at the thickening stage.

The liquid in this instance circulates upward in the mixing chamber 1 and then downward in the aggregation chamber 2, upward in the lateral chamber and then downward in the passage; it flows upward in the separator plate assemblies.

It will be realized that the inclined edge 21A defining the lower edge of the wall 21 procures approximately uniform distribution to the various separator plate modules 9.

It has been verified that with comparable quantities of untreated liquid and treated liquid the invention provides a very clear quantitative increase in comparison with known solutions using fine sand since sedimentation rates of 30 to 60 m/h and even 90 m/h can be routinely expected (with a REYNOLDS number very much higher than 200).

Given that the size of a sedimentation unit is dependent directly on the attainable sedimentation rate the economic benefit of the invention is readily understood.

Test results for a pilot installation rated at 100 to 150 m$^3$/h are given in tables 1 and 2 which show the agitation conditions and the performance achieved.

The fine sand had a grain size between 40 and 100 m and was fed into the liquid to be treated in concentrations between 1 and 4 g/l.

In table 2 the abbreviations NTU, MES and MO respectively signify: Nephelometric Turbidity Unit, Material in Suspension and Organic Materials.

It is obvious that the preceding description has been given by way of non-limiting example only and that numerous variations thereon may be proposed by those skilled in the art without departing from the scope of the invention.

TABLE 1

|  | Tank 1 | Tank 2 |
| --- | --- | --- |
| Np | 4 | 4 |
| D(m) | 1.5 | 2.5 |
| N(rps) | 1.06 | 0.25 |
| V(m$^3$) | 3.33 | 10 |
| P(W) | 36 177 | 6 103 |
| G(s$^{-1}$) | 3 296 | 781 |

TABLE 2

| Untreated liquid | | | Sedimentation rate | Microsand content g/l | Treated liquid | | |
| --- | --- | --- | --- | --- | --- | --- | --- |
| Turbidity NTU | MES mg/l | MO mg/l | | | Turbidity NTU | MES mg/l | MO mg/l |
| 16 | 26 | 3.5 | 30 | 3 | 0.9 | 2.0 | 1.7 |
| 12 | 20 | 3.8 | 30 | 1 | 1 | 2.0 | 1.9 |
| 12 | 18 | 3.6 | 30 | 1.8 | 0.8 | 1.4 | 1.8 |
| 40 | 70 | 3.4 | 60 | 2.5 | 3 | 4.0 | 1.6 |
| 42 | 75 | 3.5 | 60 | 2.8 | 2.5 | 5.0 | 1.7 |
| 41 | 74 | 3.5 | 80 | 3.0 | 3.0 | 6.0 | 1.7 |

Test results for untreated surface water (from the River Seine) using a large pilot installation (100 m$^3$/h)

We claim:

1. A method for liquid treatment by sedimentation comprising the steps of:
   injecting reagents into a flow of untreated liquid and creating in said flow a colloid mixing and destabilization area where said flow is made turbulent and where insoluble granular material denser than said liquid is injected into said liquid in predetermined proportions;
   passing said liquid flow with said insoluble granular material into an intermediate colloid aggregation area where turbulence is induced to maintain said insoluble granular material in suspension,
   passing said turbulent liquid flow together with subsequentially all of said granular material into a sedimentation area equipped with separator plates and removing clarified liquid from said separator plates; and
   removing from the sedimentation area sludge formed therein including said insoluble granular material, recovering said insoluble granular material from said sludge, and cleaning and recycling said granular material.

2. Method according to claim 1 wherein there is maintained in the mixing area a speed gradient significantly greater than that maintained in the intermediate aggregation area.

3. Method according to claim 1 wherein said granular material is fine sand and there is established in the intermediate aggregation area a speed gradient between 400 and 1,500 $s^{-1}$.

4. Method according to claim 1 wherein said granular material is fine sand and there is established in the mixing area a speed gradient between 1,500 and 4,000 $s^{-1}$.

5. Method according to claim 1 wherein said granular material is fine sand and there are established a speed gradient in the mixing area between 3000 and 35000 $s^{-1}$ and a speed gradient in the aggregation area between 700 and 900 $s^{-1}$.

6. Method according to claim 1 wherein said granular material is fine sand with a particle size between 20 and 200 $\mu m$ and said sand is injected with a concentration relative to the untreated liquid between approximately 1 and 4 g/l.

7. Method according to claim 1 wherein the time for which the liquid is in the intermediate aggregation area is between 2.5 and 3.5 times the time the liquid is in the mixing area.

8. Method according to claim 1 wherein said liquid flows upwardly in the mixing area and downwardly in the intermediate aggregation area.

9. A method according to 1 wherein said granular material is substantially inert chemically biologically.

10. A method according to claim 1 wherein said granular material is active chemically or biologically.

11. Installation for liquid treatment by sedimentation comprising:
    a colloid mixing and destabilizing chamber provided with an inlet for untreated liquid, a reagent inlet, an inlet for introducing granular material insoluble in and denser than said liquid, a first turbulent flow inducing agitator device means, and a liquid outlet;
    an intermediate aggregation chamber connected to said outlet of said colloid mixing and destabilizing chamber and provided with a second turbulent flow inducing agitation device means for maintaining said granular material in suspension and a liquid outlet;
    a sedimentation chamber connected to said outlet out said intermediate aggregation chamber for receiving turbulent flow therefrom, said sedimentation chamber including separator plates and provided in an upper part thereof with an outlet for clarified liquid located above said separator plates and in a lower part with a sludge recovering area below the separator plates having an outlet for sludge; and
    a sludge/granular material separator station connected to said outlet for sludge and to said inlet for granular material.

12. Installation according to claim 11 wherein said mixing chamber and said intermediate aggregation chamber are approximately square in cross-section and the ratio between the dimension of each chamber and the diameter of the corresponding agitator device is between approximately 0.5 and 0.8.

13. Installation according to claim 11 wherein said agitator device in said mixing chamber is a paddlewheel rotated about a vertical axis by motor means for imparting to the paddle blades peripheral speeds between 1 and 2 m/s and said agitator device of said intermediate aggregation chamber is a paddlewheel rotated about a vertical axis by motor means for imparting to the paddle blades peripheral speeds between 0.2 and 2.5 m/s.

14. Installation according to claim 11 wherein circulation of the liquid from said mixing chamber is achieved by overflow over a horizontal upper edge of a first separator wall between said mixing chamber and said intermediate aggregation chamber, by underflow beneath a horizontal edge of a second separator wall between said intermediate aggregation chamber and a lateral chamber, by overflow over an upper edge of a separator partition between said lateral chamber and a lateral distribution passage running along the length of said sedimentation chamber, and then by underflow under a lower edge of a separator wall between said lateral distribution passage and said sedimentation chamber. Said lower edge being inclined upwardly in the direction away from said lateral chamber.

15. Installation according to claim 14 wherein said intermediate aggregation chamber is approximately square in cross-section, vertical distance between said upper edge of said first wall and said lower edge of said second wall is between 1 and 3 times the side dimension of said intermediate aggregation chamber and said agitator device is situated relative to said upper edge of said wall at a depth between 0.5 and 0.9 times this vertical distance.

16. Installation according to claim 14 wherein said inclined lower edge of said separation wall between said lateral distribution passage and said sedimentation chamber rises from approximately the level of the lower edge of said separation wall between said intermediate aggregation chamber and said lateral chamber.

17. Installation according to claim 14 wherein the bottom of the sedimentation chamber is provided with means adapted to circulate the sludge towards a concentration area situated approximately underneath said intermediate aggregation chamber with which it communicates and connected to a sludge offtake channel.

18. Installation according to claim 17 wherein the bottom of the sedimentation chamber is inclined towards said concentration area.

19. Installation according to 11 wherein said agitator device of said intermediate aggregation chamber is an axial flow screw.

20. Installation according to claim 19 further comprising means for driving said axial flow screw in a direction tending to oppose the flow of the liquid; and wherein said installation comprises means for directed said liquid flow upwardly in the mixing chamber and means for directing the liquid flow downwardly in the intermediate aggregation chamber.

* * * * *